(12) United States Patent
Sinha et al.

(10) Patent No.: US 7,625,592 B1
(45) Date of Patent: Dec. 1, 2009

(54) PROCESS AND FORMULATION FOR DRIED TOMATOES

(75) Inventors: Nirmal K. Sinha, Frankfort, MI (US); Meena Sinha, Frankfort, MI (US)

(73) Assignee: Graceland Fruit, Inc., Frankfort, MI (US)

( * ) Notice: Subject to any disclaimer, the term of this patent is extended or adjusted under 35 U.S.C. 154(b) by 467 days.

(21) Appl. No.: 11/439,756

(22) Filed: May 24, 2006

(51) Int. Cl.
*A23B 7/08* (2006.01)
*A23L 1/212* (2006.01)

(52) U.S. Cl. .................. 426/639; 426/455; 426/506; 426/518; 426/615; 426/640; 426/658

(58) Field of Classification Search .................. 426/615, 426/639, 640, 658, 455, 506, 518
See application file for complete search history.

(56) References Cited

U.S. PATENT DOCUMENTS

| 2,420,517 | A | 5/1947 | Brandner et al. |
|---|---|---|---|
| 4,542,033 | A | 9/1985 | Agarwala |
| 5,260,088 | A | 11/1993 | Bernard |
| 5,718,939 | A | 2/1998 | Nugent |
| 6,524,640 | B1 | 2/2003 | Sinha |
| 6,743,460 | B2 | 6/2004 | May |

*Primary Examiner*—Helen F Pratt
(74) *Attorney, Agent, or Firm*—Varnum, Riddering, Schmidt & Howlett LLP (57) ABSTRACT

A process for drying tomatoes which produces higher yielding dried tomatoes having improved color and flavor without the use of preservatives and sulfur dioxide is provided. Generally, the process includes chilling or freezing tomatoes, infusing the tomatoes with an infusion solution, and then drying the tomatoes. The tomatoes may be cut into two or more pieces, bruised or abraised before infusion.

19 Claims, 4 Drawing Sheets

PROCESS AND FORMULATION FOR DRIED TOMATOES

BACKGROUND OF THE INVENTION

Cultivated tomatoes, *lycopersicum esculentum*, belong to the night shade family, Solanaceae and contain health promoting constituents such as the antioxidant lycopene, which is responsible for its red color. It is also believed that tomatoes possess potential benefit to prostate health.

Processed tomatoes rank very high in consumption among vegetables, partly because of tomatoes' unique flavor and color. In terms of per capita consumption, tomatoes are second only to potatoes. A number of tomato products, such as canned tomatoes, tomato juice and concentrates, tomato puree and paste, sauces, ketchup, soups and tomato powder are available. Generally, tomatoes are peeled and processed into these products. Typical peeling methods employed include: hot water peeling; steam peeling; lie peeling; freeze-thaw peeling; flame peeling; infrared peeling; and high temperature, high-pressure dry peeling.

Also on the market are dried tomatoes which can be used as food ingredients in several culinary applications, including salads, pastas, sauces and dips. Typically, dried tomato products are produced by the process of sun drying. Generally, in a sun drying operation, ripened tomatoes are washed, cut into halves, optionally passed through a water bath containing sulfur dioxide, and then sun dried in trays for about 7 to about 10 days. Sun dried tomatoes often contain sulfur dioxide to preserve color and shelf life. The moisture content of sun dried tomatoes typically ranges from about 12% to about 24%. Generally, about 20 pounds of vine ripened tomatoes will yield about 1 pound sun dried product, a yield of about 5%. In the United States, dried tomatoes are produced primarily in California. Dried tomatoes have also been imported to the United States from other countries including Chile, Italy, Mexico, Spain and Turkey.

A significant need exists in the food industry for a process for producing higher yielding dried tomatoes having better color and flavor, without the use of preservatives or sulfur dioxide.

SUMMARY OF THE INVENTION

One embodiment of the present invention includes a process for drying tomatoes which produces higher yielding dried tomatoes having improved color and flavor without the use of preservatives and sulfur dioxide. Generally, the process involves the steps of chilling tomatoes; infusing the tomatoes with an infusion solution, typically a mixture of corn syrup and saline solution; and thereafter drying the tomatoes. In another embodiment, the tomatoes are frozen, infused and dried. In yet another embodiment, the tomato is cut into two or more pieces or the skin of the tomato is abraded or cut before infusion and drying.

These and other features, advantages, and objects of the present invention will be further understood and appreciated by those skilled in the art by reference to the following specification, claims, and appended drawings.

DETAILED DESCRIPTION OF PREFERRED EMBODIMENT

Generally, the processes of the present invention usually involve the steps of chilling or freezing a tomato, typically a grape tomato; cutting the tomato into two or more pieces or abrading the outer skin of a typically whole tomato; infusing the tomato or tomato pieces; and then drying the tomato or tomato pieces.

Any variety of tomato is suitable for use in the process of the present invention. Commonly grown types of tomato include beefsteak, plum, grape and cherry tomatoes. Suitable tomato varieties include, but are not limited to Beefsteak, Better Boy, Big Boy, Early Girl, and Roma. Preferably, the tomatoes are grape tomatoes and most preferably the tomatoes are fresh grape tomatoes.

Figure 1:
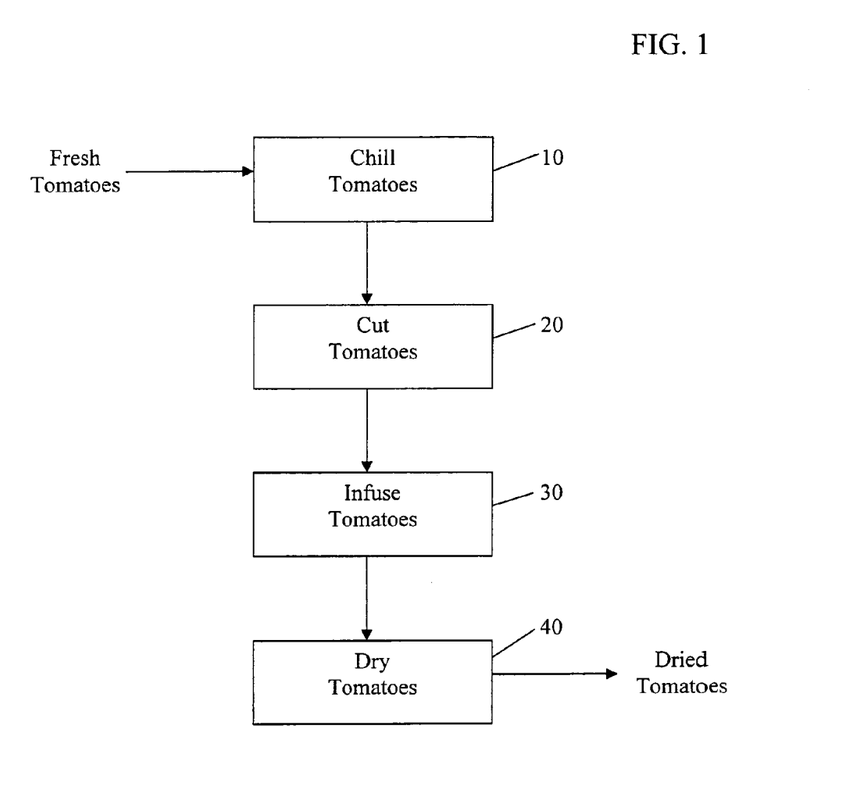
FIG. 1 is a process flow chart generally showing the process steps for producing dried tomatoes according to an embodiment of the present invention which includes chilling the tomatoes, cutting the tomatoes, infusing the tomatoes with an infusion solution and then drying the tomatoes.

Referring to FIG. 1, in an embodiment of the present invention, fresh tomatoes, typically fresh grape tomatoes, are chilled 10. Chilling the tomatoes typically involves subjecting the tomatoes to a temperature of from about 35° F. to about 45° F. The tomatoes are typically chilled for about 1 day to about 10 days prior to further processing the tomatoes. The tomatoes are chilled for at least an amount of time sufficient to firm the texture of the tomato such that the flesh of the tomato is capable of being cut or abraded without substantial damage to the interior of the tomato. Lowering the temperature of the tomato by chilling or alternatively, by freezing, fresh tomatoes prior to use firms the texture of the tomato and facilitates subsequent cutting or abrading operations.

Next, in this embodiment of the present invention the chilled tomatoes are cut into two or more pieces 20. Typically, the chilled tomato is cut into two or more pieces of approximately equal size. More typically, the chilled tomato is cut into two pieces of approximately equal size. Cutting the chilled tomato prior to infusion generally reduces the amount of time required for the subsequent infusing step 30 and drying step 40.

The tomatoes are infused 30 by placing the tomatoes into an infusion bath containing an infusion solution. The infusion solution may be any liquid which is safe for consumption. Preferably, the infusion solution is capable of increasing the initial tomato solids by at least about 300% or more, more typically by about 300%. Suitable liquids for infusion into a tomato, typically a grape tomato, include: water, a saline solution, a salt substitute, a sweetener, a fruit juice concentrate, a vegetable juice concentrate, and mixtures thereof. A suitable salt substitute includes potassium chloride. Sweeteners such as artificial, natural, caloric and non-caloric sweeteners may be used. Suitable sweeteners for the infusion solution include artificial sweeteners such as sorbitol, xylitol, maltitol, sucrose, aspartame, saccharine and mixtures thereof. Suitable natural sweeteners include sucrose, fructose, glucose, galactose, maltose, lactose, mannose and mixtures thereof. One particularly preferred sweetener is corn syrup. Any fruit juice or vegetable juice concentrate may be used. Fruit juice concentrate such as an apple, grape, orange juice concentrate or a mixture thereof may be used in the infusion solution. Vegetable juice concentrates include carrot and tomato juice concentrate. Typically tomato juice concentrate is used. Typically, the infusion solution includes a saline solution, one or more sweeteners, tomato juice concentrate, and mixtures thereof. More typically, the infusion solution includes saline solution and one or more sweeteners and most typically, the infusion solution includes saline solution and corn syrup.

Generally, saline is a solution of sodium chloride in water which improves flavor attributes of the dried tomatoes. Saline solutions are available in various concentrations. The saline solution used in the present invention is typically about 1.5% to about 4.0% by weight sodium chloride, more typically about 2.0% to about 4.0% by weight sodium chloride, and most typically 2.5% by weight sodium chloride. The infusion solution typically includes from about 55% to about 60% by weight saline solution, more typically from about 57% to about 59% saline solution, and most typically about 57% to about 58.5% by weight saline solution. The amount of sweetener, typically a corn syrup, in the infusion solution is typically from about 40% to about 45% sweetener by weight of the infusion solution, more typically from about 41% to about 43%, and most typically from about 42% to about 43% corn syrup by weight of the infusion solution. The Brix of the infusion solution is typically about 40 to about 60 Brix, more typically about 40 to about 50 Brix, and most typically about 40 Brix. The Brix value of the infusion solution is measured using a Brix scale, which is a hydrometer scale for sugar solutions so graduated that its reading is at a specified temperature, represents percentages of weight of sugar in solution.

The temperature of the infusion solution may range from about 50° F. to about 80° F. More typically, the temperature of the infusion solution is from about 60° F. to about 80° F., and most typically from about 60° F. to about 70° F. Once placed in the infusion solution, the tomatoes, typically grape tomatoes, are infused for from about 4 to about 24 hours, more typically for from about 3 to about 6 hours and most typically for from about 4 to about 5 hours. Generally, the longer the tomatoes remain in the infusion solution, the higher the Brix of the tomatoes will be when removed from the infusion solution. Typically, the Brix of the tomatoes after infusion is about 10 to about 20 Brix.

The infused tomatoes are removed from the infusion bath and dried 40. Typically, the infused tomatoes are dried using heated air having a temperature of from about 165° F. to about 175° F., more typically at about 170° F., for about 5 hours to about 7 hours. The moisture content of tomatoes after drying is typically about 6% to about 13.5%. The water activity ($A_w$) of tomatoes after drying is typically from about 0.3 to about 0.6 and more typically from about 0.38 to about 0.59. The term "water activity" describes the (equilibrium) amount of water available for hydration of materials; a value of unity indicates pure water, whereas zero indicates the total absence of water molecules.

Figure 2:
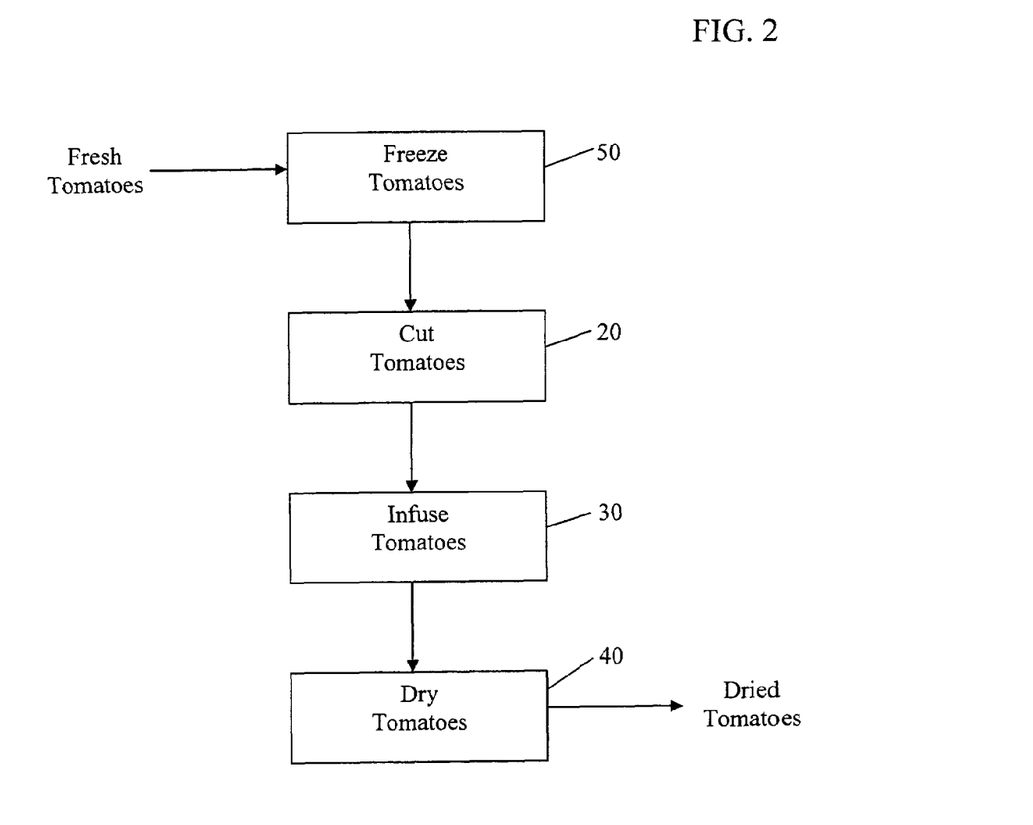
FIG. 2 is a process flow chart generally showing the process steps for producing dried tomatoes according to another embodiment of the present invention which includes freezing the tomatoes, cutting the tomatoes, infusing the tomatoes with an infusion solution and then drying the tomatoes.

Another embodiment of the process of the present invention is generally shown in FIG. 2. In this embodiment of the present invention, fresh tomatoes are frozen 50 prior to use. Typically, freezing the tomatoes 50 involves subjecting the tomatoes to a temperature below about 32° F. for a time sufficient to freeze the tomato. Once frozen, the tomatoes, typically grape tomatoes, are cut 20, infused 30, and dried 40 as discussed above. Generally, cutting the frozen tomatoes into at least two or more pieces of approximately equal size facilitates uniform infusion and subsequent drying of the tomato pieces and reduces the amount of time needed to infuse and dry the tomatoes. Most typically, the frozen tomatoes are cut into two pieces of at least approximately equal size.

Figure 3:
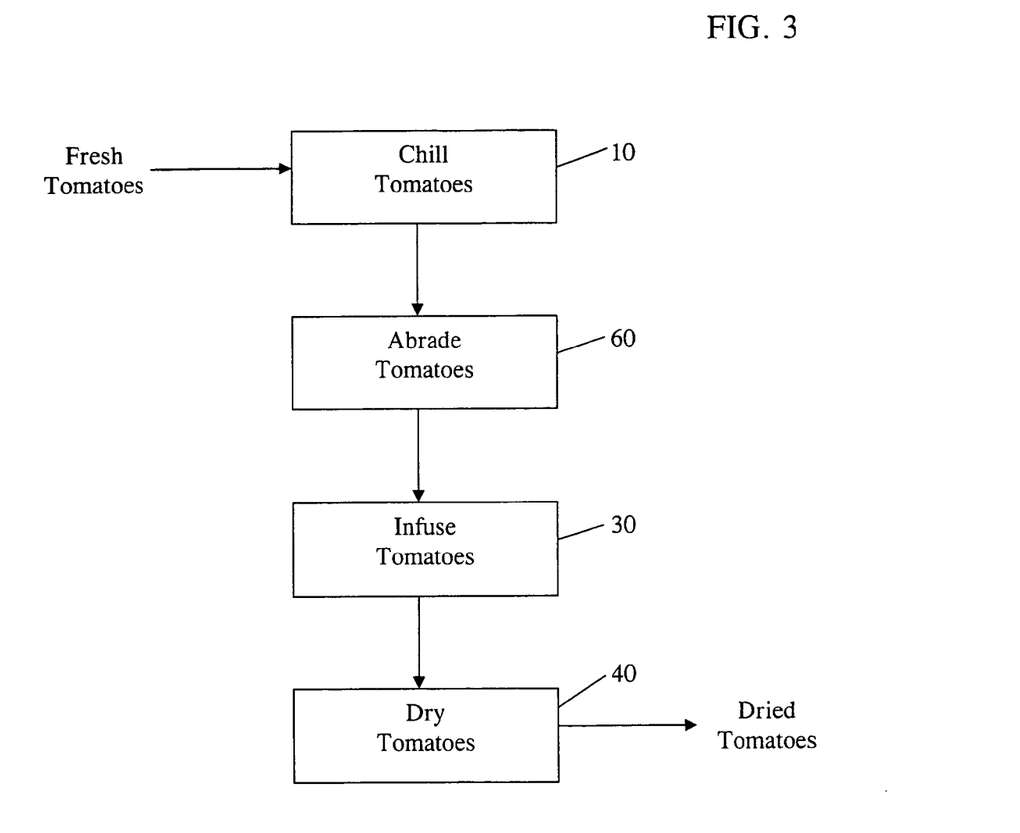
FIG. 3 is a process flow chart generally showing the process steps for producing dried tomatoes according to another embodiment of the present invention which includes chilling the tomatoes, abrading the outer skin of the tomatoes, infusing the tomatoes with an infusion solution and then drying the tomatoes.

Yet another embodiment of the process of the present invention is generally shown in FIG. 3. In this embodiment, the fresh tomatoes are chilled 10 as first discussed above in the process generally shown in FIG. 1. Then, in this embodiment, the outer skin of the chilled tomato is abraded 60. The outside surface of the tomato skin may be abraded using a potato peeler or some other method of rubbing the skin of the tomato against a sharp or rough surface. The potato peeler is typically an abrasive surface peeler, and includes a cylindrical drum, in which the inside of the drum is lined with an abrasive material such as sand paper or similar material. Typically, the grit of the abrasive material is similar to an about #60 grade sand paper. Typically, whole tomatoes are introduced into one end of the cylindrical drum. The tomatoes can be abraded in a batch or a continuous process. As the drum rotates, the surface of the tomatoes rub up against the abrasive lining, thereby scraping or abrading the outer skin of the tomato. The abraded tomatoes are removed from the other end of the cylindrical drum. Typically, water is not added to the cylinder when the tomatoes are abraded. It has been found that slight abrasion of the tomato skin reduces the time required to infuse the tomatoes. Typically, the outer skin of the whole tomato is abraded by passing the tomatoes through a potato peeler for about 5 to about 30 seconds. More typically, the whole tomato is abraded for about 5 to about 15 seconds, and most typically, about 5 to about 10 seconds. Abrasion is particularly suitable for infusing and drying whole tomatoes. Although not typically done, whole fresh chilled or frozen tomatoes may be first abraded and then cut into two or more pieces. Alternatively, chilled or frozen tomatoes can be cut into two or more pieces before abrading the tomato skin, however this is typically not preferred. The chilled and abraded fresh tomatoes are infused 30 as discussed above and then dried 40. The infused tomatoes of this embodiment of the present invention are typically dried with heated air having a temperature of from about 165° F. to about 175° F., more typically at about 170° F. for about 24 hours.

Figure 4:
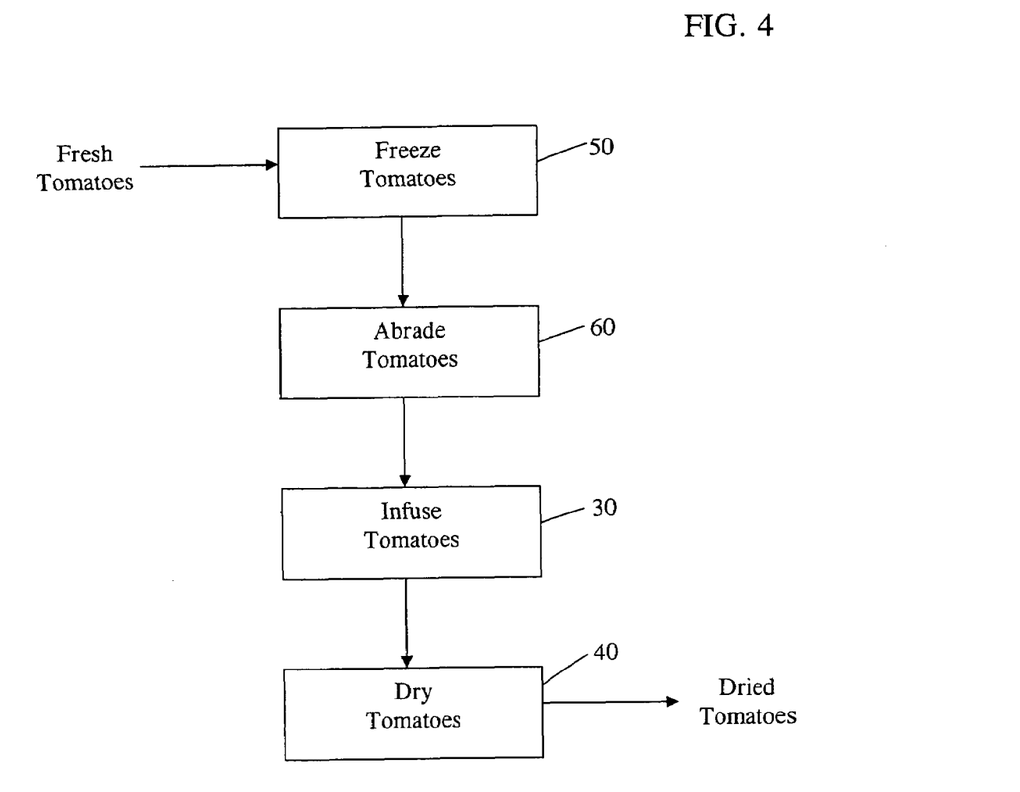
FIG. 4 is a process flow chart generally showing the process steps for producing dried tomatoes according to another embodiment of the present invention which generally includes freezing the tomatoes, abrading the outer skin of the tomatoes, infusing the tomatoes with an infusion solution and then drying the tomatoes.

Another embodiment of the process of the present invention is generally shown in FIG. 4. In this embodiment, fresh tomatoes are first frozen 50 as discussed in the process generally shown in FIG. 2, then abraded 60, infused 30 and dried 40 as generally shown in FIG. 3. Although this embodiment of the process may be used, it is not as preferred. Applicants have discovered that dried tomatoes produced using the process of this embodiment of the invention can be softer and somewhat difficult to handle.

Typically, the texture of the dried tomato product produced in accordance with the embodiments of the present invention is soft, the product has a typical tomato flavor. Its red color is similar to that of a fresh tomato and the color holds very well even at ambient temperatures for several months. The dried tomatoes can be used as food ingredients in several culinary applications, including salads, pastas, sauces and dips. In each of the above described processes, at least substantially no sulfur is added to the tomatoes, more typically no additional sulfur is added. Typically, no sulfur is added to the tomato during the processing according to the present invention. The following examples more precisely and particularly illustrate the specific details of the present invention. Equivalent procedures and quantities will occur to those skilled in the art and, therefore, the following examples are not meant to define the limits of the present invention, these being defined by the scope of the appended claims.

Example 1

This example illustrates the process of the present invention generally shown in FIG. 1. The processing parameters of this example are listed in Table 1.

About two pounds of fresh whole grape tomatoes were chilled for about 1 day to about 10 days. The fresh tomatoes had an initial Brix of about 4.8 Brix, an initial pH of about 4.3 and about 0.43% titrable acidity as citric acid. The initial color of the tomatoes was measured using a Hunter calorimeter. In these measurements, L* designates lightness on a scale of 0-100 (0 for black and 100 for white); a* designates red to green, where a negative a* denotes green; b* designates yellow to blue, where a negative b* denotes blue; and h* designates the hue angle ($\tan^{-1}$ b/a).

The chilled tomatoes were then cut into two pieces of approximately equal size. After cutting, the tomatoes were placed in an infusion bath containing an infusion solution for about 4.0 hours. The infusion solution included about 42.5% corn syrup by weight of the infusion solution and about 57.5% of saline solution by weight of the infusion solution. The saline solution had a concentration of about 2.5% by weight sodium chloride in water. The infusion solution had a Brix of about 40 Brix and a temperature of about 60° F. to about 80° F. When removed from the infusion solution, the infused tomatoes had a Brix of about 16.0 Brix.

The infused tomatoes were then dried for about 5.0 hours at a temperature of about 170° F. The weight of the dried tomatoes was about 0.26 pounds. The resulting dried tomatoes had about 8.9% moisture content and a water activity of about 0.460. The process of this embodiment of the present invention resulted in a yield of about 13%. The percent yield was calculated by dividing the weight of the dried tomatoes by the weight of the fresh tomatoes and then multiplying by 100. The dried tomatoes produced using the above process possessed a typical tomato flavor and a soft texture. The color of the dried tomatoes approximated the color of the fresh tomatoes.

For comparison, a control product was produced by cutting whole grape tomatoes into two pieces of approximately equal size and then drying the cut tomatoes. The grape tomatoes were not chilled prior to cutting or infused before drying. The process used to produce the control product resulted in a yield of about 10%. The flavor of the control product was not as good as the dried infused product above. The control product had a brownish color.

TABLE 1

| | Typical Data |
|---|---|
| I. Data on unprocessed, fresh tomatoes used in the process | |
| 1. Type of tomato | Whole grape tomatoes |
| 2. Initial Brix (soluble solids) | 4.8 |
| 3. Initial pH | 4.3 |
| 4. % Titrable acidity as citric acid | 0.43 |
| 5. Initial Color quality: | |
| L* (Lightness, black to white) | 24.2 |
| a* (Red color) | 31.5 |
| b* (Yellow color) | 22.9 |
| h* (hue angle) | 36.1 |

TABLE 1-continued

| | Typical Data |
|---|---|
| 6. Weight used in the process | 2.0 lb |
| 7. Treatment | Chilled, cut into halves and infuse |
| II. Data on Infusion | |
| 1. Weight of infusion syrup | 4.0 lb |
| a. Corn syrup | 1.7 lb |
| b. Saline Solution | 2.3 lb water + 22.7 gram salt |
| 2. Brix of syrup | 40.0 |
| 3. Infusion temperature | 60-80 F. |
| 4. Infusion time | 4.0 hr |
| III. Data on infused tomatoes | |
| 1. Infused tomatoes Brix | 16.0 |
| 2. Infused tomatoes weight | 1.7 lb |
| IV. Data on drying | |
| 1. Drying Temp (F.) | 170.0 |
| 2. Drying Time | 5.0 hours |
| V. Final Data on dried tomatoes produced according to the present invention | |
| 1. Weight of dried tomatoes | 0.26 lb |
| 2. % Yield | 13.0 |
| 3. % Moisture | 8.9 |
| 4. Water activity | 0.460 |
| 5. Color quality: | |
| L* (Lightness, black to white) | 23.9 |
| a* (Red color) | 25.6 |
| b* (Yellow color) | 19.2 |
| h* (hue angle) | 36.9 |
| 6. Flavor | Typical tomato flavor |
| 7. Texture | Not hard and leathery |

Example 2

This example illustrates the process of the present invention generally shown in FIG. 2. The processing parameters of this example are listed in Table 2. About three pounds of fresh whole grape tomatoes were frozen at a temperature about 32° F. or less for at least 12 hours. The fresh tomatoes had an initial Brix of about 4.8 Brix and an initial pH of about 4.3. The color of the fresh tomatoes was measured using a Hunter calorimeter. The color measurements of the fresh tomatoes are listed in Table 4.

After freezing, the tomatoes were cut into two pieces of approximately equal size and placed in an infusion bath of infusion solution for about 5.0 hours. The infusion solution included about 41.7% corn syrup by weight of the infusion solution and about 58.3% saline solution by weight of the infusion solution. The saline solution had a concentration of about 2.5% by weight sodium chloride. The infusion solution had a Brix of about 40 Brix and a temperature of from about 60° F. to about 80° F. When removed from the infusion solution, the infused tomatoes had a Brix of about 12.0 Brix.

The infused tomatoes were then dried for about 5.0 hours at a temperature of about 170° F. The weight of the dried tomatoes was about 0.44 pounds. The resulting dried tomatoes had about 6.8% moisture content and a water activity of about 0.389. The process of this embodiment of the present invention resulted in an about 14.7% yield. The dried tomatoes produced using this process possessed a typical tomato-like flavor and color and a soft texture.

As a control, grape tomatoes were frozen, cut into two pieces of approximately equal size and then dried. The frozen grape tomatoes used for comparison were not infused before drying. This process resulted in a yield of about 9.5%. The color of this product was brownish.

TABLE 2

| | Typical Data |
|---|---|
| I. Data on the unprocessed, fresh tomatoes used in the process | |
| 1. Type of tomato | Whole grape tomatoes |
| 2. Initial Brix (soluble solids) | 4.8 |
| 3. Initial pH | 4.3 |
| 4. Initial Color quality: | |
| L* (Lightness, black to white) | 24.2 |
| a* (Red color) | 31.5 |
| b* (Yellow color) | 22.9 |
| h* (hue angle) | 36.1 |
| 5. Weight used in the process | 3.0 lb |
| 6. Treatment | Freeze, cut into halves and infuse |
| II. Data on Infusion | |
| 1. Weight of infusion syrup | 6.0 lb |
| a. Corn syrup | 2.5 lb |
| b. Saline Solution | 3.5 lb water + 34.0 gram salt |
| 2. Brix of syrup | 40.0 |
| 3. Infusion temperature | 60-80 F. |
| 4. Infusion time | 5.0 hr |
| III. Data on infused tomatoes | |
| 1. Infused tomatoes Brix | 12.0 |
| 2. Infused tomatoes weight | 2.6 lb |
| IV. Data on drying | |
| 1. Drying Temp (F.) | 170.0 |
| 2. Drying Time | 5.0 hours |
| V. Final Data on dried tomatoes produced according to the present invention | |
| 1. Weight of dried tomatoes | 0.44 lb |
| 2. % Yield | 14.7 |
| 3. % Moisture | 6.8 |
| 4. Water activity | 0.389 |
| 5. Color quality: | |
| L* (Lightness, black to white) | 24.5 |
| a* (Red color) | 26.8 |
| b* (Yellow color) | 18.9 |
| h* (hue angle) | 35.2 |
| 6. Flavor: | Typical tomato like |
| 7. Texture: | Not hard and leathery |

Example 3

This example illustrates the process of the present invention generally shown in FIG. 3. The processing parameters of this example are listed in Table 3. About five pounds of fresh whole grape tomatoes were chilled for about 1 to 10 days. The tomatoes had an initial Brix of about 4.8 Brix and an initial pH of about 4.3.

After chilling, the skin of the whole tomato was abraded on the outside surface of the tomato for about 10 to about 30 seconds, passing the tomatoes through a potato peeler. The chilled, abraded whole grape tomatoes were then placed in an infusion solution for about 24 hours. The infusion solution included about 42% corn syrup by weight of the infusion solution and about 58% saline solution by weight of the infusion solution. The saline solution had a concentration of about 2.1% by weight sodium chloride. The infusion solution had a Brix of about 40 Brix and a temperature of about 60° F. to about 70° F. When removed from the infusion solution, the infused tomatoes had a Brix of about 19.6 Brix.

The infused tomatoes were then dried for about 7 hours in heated air having a temperature of about 170° F. The weight of the dried tomatoes was about 0.96 pounds. The resulting dried tomatoes had a moisture content of about 13.2% and a water activity of about 0.585. The process of this embodiment of the present invention resulted in an about 19.2% yield. The dried tomatoes produced using the process generally shown in FIG. 3 possessed a typical tomato flavor and color, a soft texture, and could be cut and rehydrated easily.

As comparison, a control product was produced by abrading whole grape tomatoes and then drying the abraded tomatoes without infusion. The process used to produce the control product resulted in a yield of about 11%. The control product had a brown color and a hard texture.

TABLE 3

| | Typical Data |
|---|---|
| I. Data on the unprocessed, fresh tomatoes used in the process | |
| 1. Type of tomato | Whole grape tomatoes |
| 2. Initial Brix (soluble solids) | 4.8 |
| 3. Initial pH | 4.3 |
| 4. Initial Color quality: | |
| L* (Lightness, black to white) | 24.2 |
| a* (Red color) | 31.5 |
| b* (Yellow color) | 22.9 |
| h* (hue angle) | 36.1 |
| 5. Weight used in the process | 5.0 lb |
| 6. Treatment | Whole fresh-chilled, skin abraised and infused |
| II. Data on Infusion | |
| 1. Weight of infusion syrup | 10.0 lb |
| a. Corn syrup | 4.2 lb |
| b. Saline Solution | 5.8 lb water + 56.7 gram salt |
| 2. Brix of syrup | 40.0 |
| 3. Infusion temperature | 60-70 F. |
| 4. Infusion time | 24.0 hr |
| III. Data on infused tomatoes | |
| 1. Infused tomatoes Brix | 19.6 |
| 2. Infused tomatoes weight | 4.0 lb |
| IV. Data on drying | |
| 1. Drying Temp (F.) | 170.0 |
| 2. Drying Time | 7.0 hours |
| V. Final Data on dried tomatoes produced according to the present invention | |
| 1. Weight of dried tomatoes | 0.96 lb |
| 2. % Yield | 19.2 |
| 3. % Moisture | 13.2 |
| 4. Water activity | 0.585 |
| 5. Color quality: | |
| L* (Lightness, black to white) | 21.2 |
| a* (Red color) | 22.4 |
| b* (Yellow color) | 15.2 |
| h* (hue angle) | 34.2 |
| 6. Flavor: | Typical tomato like |
| 7. Texture: | Not hard and leathery Soft texture that can cut and re-hydrate well |

A comparison of the calorimeter measurements for the fresh tomatoes before processing, the dried tomatoes processed using an embodiment of the present invention and the control tomatoes is shown in Table 4.

TABLE 4

| Sample | Color data | | | |
|---|---|---|---|---|
|  | L* | a* | b* | h* |
| 1. Fresh tomato | 24.2 | 31.5 | 22.9 | 36.1 |
| 2. Example 1 | 23.9 | 25.6 | 19.2 | 36.9 |
| 3. Example 2 | 24.5 | 26.8 | 18.9 | 35.2 |
| 4. Example 3 | 21.2 | 22.4 | 15.2 | 34.2 |
| 5. Average of Examples 1-3 | 23.2 | 24.9 | 17.8 | 35.4 |
| 6. % Difference in colorimetric measurements of fresh tomato and the average of Examples 1-3 | 4.1% | 20.8% | 22.4% | 1.8% |
| 7. Control for examples 1 & 2 | 24.2 | 17.6 | 15.5 | 41.4 |
| 8. Control for example 3 | 19.0 | 16.9 | 13.1 | 37.0 |

As discussed above, L* designates lightness on a scale of 0-100 (0 for black and 100 for white); a* designates red to green, where a negative a* denotes green; b* designates yellow to blue, where a negative b* denotes blue; and h* designates the hue angle ($\tan^{-1}$ b/a). The hue indicates the basic color of an object and is defined by its angular position in a cylindrical color space. Preferably, L*, a*, b* and h* values of the dried tomato products produced in accordance with an embodiment of the present invention are similar to the L*, a*, b* and h* values of the fresh tomato.

Typically, a fresh tomato has an L* value of about 21 to about 30. Typically, the L* value of the dried infused tomato is typically greater than about 21, more typically is from about 21 to about 25. The average L* value of the three examples is 23.2.

Typically, a fresh tomato has an a* value of about 20 to about 32. Typically, the a* value of the dried infused tomato is typically greater than about 20, more typically is from about 20 to about 30 and most typically from about 22 to about 27. The average a* value of the three examples is 24.9. The control dried tomatoes, which were not infused, lost more than 50% of red color (a*) value.

The b* value of a fresh tomato is typically about 15 to about 25. Typically, the b* value of the dried infused tomato is typically greater than about 15, more typically is from about 15 to about 20. The average b* value of the three examples is 17.8. The control dried tomatoes lost more than 30% of the yellow color (b*) value.

The h* value of a fresh tomato is typically about 25 to about 40. Typically, the h* value of the dried infused tomato is typically greater than 34; more typically is from about 34 to about 37. The average h* value of the three examples is 35.4%. The control dried tomatoes had a hue angle (h*) which was about 2.5% to about 14.7% greater than the hue angle of the fresh tomatoes.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A process for preparing a dried tomato comprising the steps of:
    providing a fresh tomato;
    chilling the fresh tomato at a temperature of about 35° F. to about 45° F. for at least about 1 day;
    processing the chilled tomato by a process selected from the group consisting of 1) cutting the chilled tomato into two or more pieces and 2) abrading the chilled tomato;
    infusing the chilled and processed tomato with an infusion solution comprising 40-45% sweetener at a temperature of about 50-80° F. until the tomatoes are infused at a level of about 10 to about 20 Brix; and
    drying the infused tomato, wherein the dried, infused tomato comprises an a* value of at least about 20.

2. The process of claim 1, wherein the infusion solution comprises a liquid chosen from the group consisting of water, a saline solution, a salt substitute, a sweetener, a fruit juice concentrate, a vegetable juice concentrate, and mixtures thereof.

3. The process of claim 2, wherein the infusion solution comprises a saline solution comprising a concentration of about 1.5% to about 4.0% by weight sodium chloride in water and a sweetener comprising corn syrup.

4. The process of claim 3, wherein the infusion solution comprises about 40% to about 45% of a corn syrup and about 55% to about 60% of a saline solution containing from about 1.5 to about 4.5% sodium chloride, wherein all amounts are by weight of the infusion solution.

5. The process of claim 1, wherein the infusion solution comprises about 40 Brix to about 60 Brix and a temperature of about 60° F. to about 80° F., and wherein the dried, infused tomato comprises an a* value of from about 20 to about 30.

6. The process of claim 1, wherein infusing the chilled tomato pieces with an infusion solution comprises immersing the chilled tomato pieces in an infusion bath comprising the infusion solution for about 4 hours to about 24 hours; wherein the dried, infused tomato comprises an L* value of at least about 21, a b* value of at least about 15 and an h value of from about 34 to about 37; and wherein the dried, infused tomato is free of added sulfur.

7. The process of claim 1, wherein drying the infused tomato comprises drying with heated air having a temperature of from about 165° F. to about 175° F. for about 5 hours to about 7 hours.

8. The process of claim 1, wherein the product produced by the process comprises a moisture content of from about 6% to about 13.5% and a water activity of from about 0.3 to about 0.6.

9. The process of claim 1, wherein the processing comprises cutting the chilled tomato into two or more pieces.

10. The process of claim 1, wherein the processing comprises abrading the chilled tomato.

11. The process of claim 1, wherein the dried, infused tomato comprises an a* value of from about 20 to about 30 and wherein the dried, infused tomato is substantially free of any artificial, added sulfur.

12. The process of claim 11, wherein the dried, infused tomato is free of any added sulfur not naturally occurring in the fresh tomato.

13. A process for preparing a dried tomato comprising the steps of:
    providing a tomato;
    freezing the tomato;
    processing the frozen tomato by a process comprising a process chosen from the group consisting of cutting the frozen tomato into two or more pieces and abrading the frozen tomato;
    infusing the processed, frozen tomato with an infusion solution comprising 40-45% sweetener at a temperature of about 50-80° F. until the tomatoes are infused at a level of about 10 to about 20 Brix; and
    drying the infused tomato; and
    wherein the dried infused tomato comprises an a* value of at least about 20.

14. The process of claim 13, wherein the infusion solution comprises a liquid chosen from the group consisting of water, a saline solution, a salt substitute, a sweetener, a fruit juice concentrate, a vegetable juice concentrate, and mixtures thereof.

15. The process of claim 14, wherein the infusion solution comprises a saline solution comprising a concentration of about 1.5% to about 4.0% by weight sodium chloride in water and a sweetener comprising corn syrup.

16. The process of claim 15, wherein the infusion solution comprises about 40% to about 45% of a corn syrup and about 55% to about 60% of a saline solution containing from about 1.5 to about 4.5% sodium chloride, wherein all amounts are by weight of the infusion solution.

17. A process for preparing a dried tomato comprising the steps of:
providing a fresh tomato;
chilling the fresh tomato at a temperature of about 35° F. to about 45° F. for at least about 1 day;
processing the chilled tomato by a process comprising a process chosen from the group consisting of cutting the chilled tomato into two or more pieces and abrading the chilled tomato;
infusing the chilled and processed tomato with an infusion solution comprising 40-45% sweetener at a temperature of about 50-80° F. until the tomatoes are infused at a level of about 10 to about 20 Brix; and
drying the infused tomato, wherein the dried, infused tomato comprises an a* value of from about 22 to about 27, an L* value of from about 21 to about 25, a b* value of from about 15 to about 20, and an h* value of from about 34 to about 37.

18. The process of claim 17, wherein the infusion solution comprises a liquid chosen from the group consisting of water, a saline solution, a salt substitute, a sweetener, a fruit juice concentrate, a vegetable juice concentrate, and mixtures thereof.

19. The process of claim 18, wherein the infusion solution comprises about 40% to about 45% of a corn syrup by weight of the infusion solution and about 55% to about 60% of a saline solution by weight of the infusion solution, and wherein the saline solution comprises a concentration of about 1.5% to about 4.0% by weight sodium chloride in water.

* * * * *